Feb. 10, 1953   J. W. ANDERSON   2,628,074
PORTABLE HINGED SLAT FENCE
Filed May 29, 1950   2 SHEETS—SHEET 1
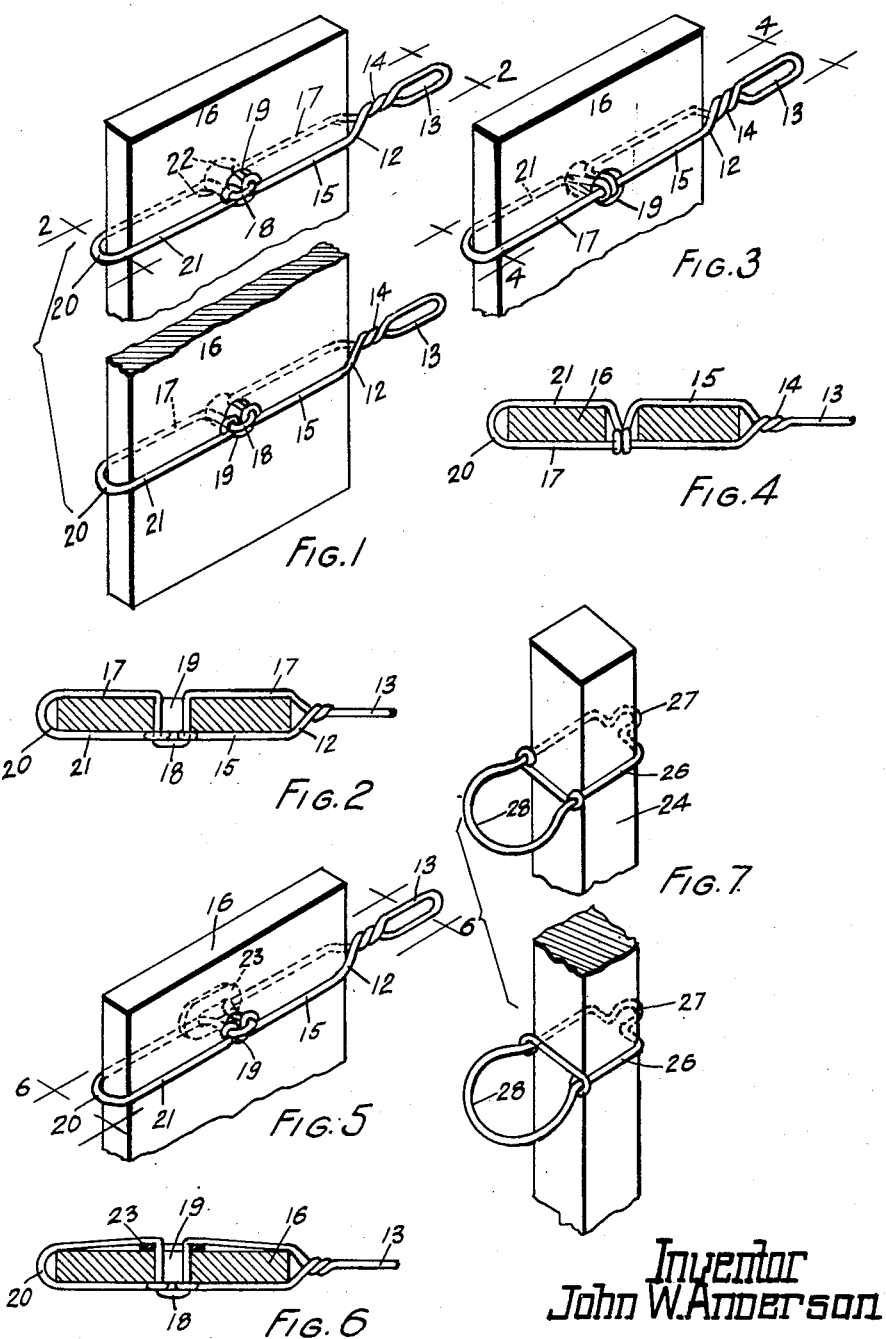

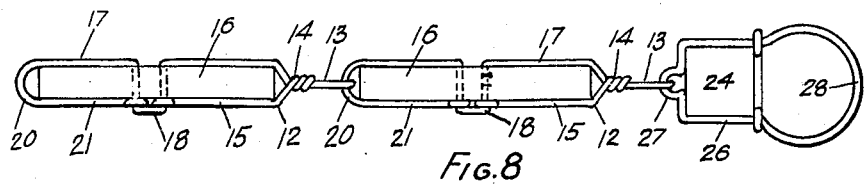
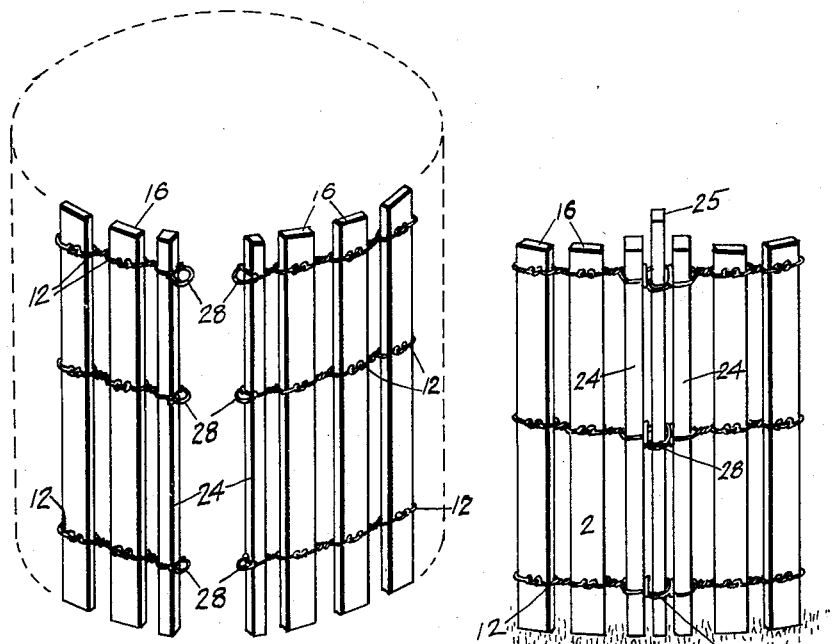
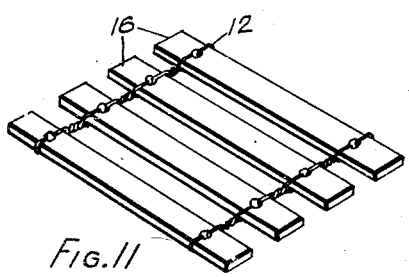

Patented Feb. 10, 1953

2,628,074

UNITED STATES PATENT OFFICE 2,628,074

PORTABLE HINGED SLAT FENCE

John Wilson Anderson, Baldoon, Shaw, via
Blayney, New South Wales, Australia

Application May 29, 1950, Serial No. 165,004
In Australia June 2, 1949

10 Claims. (Cl. 256—26)

This invention relates to means for forming portable fences or enclosures for use in yarding, working and drafting sheep and the like, in mulesing and other operations on station properties, for furnishing traction strips, as for use in extricating motor vehicles from boggy surfaces, for providing for surfaces over loose, sandy or muddy areas and the like, also for providing air strips and surfacing for aerodromes, and also for many other purposes for which such means may be suited.

The invention has been specially devised to provide means of a simple, strong and inexpensive nature for the above stated purposes, and many other uses as well, and which means can be quickly and easily manufactured, and such portable enclosures and the like have suitable flexibility whereby they can be formed into varied shapings to suit different requirements, and can be folded or rolled for ready transport and conveniently handled with a minimum of manual effort.

A further advantage in this invention is that the slat-like members embodied in the fences and the like cannot become displaced or detached from their coupling devices even should timber or the like used in such members shrink or warp.

A still further object in the invention is to take the place of wire netting and the like which is not only expensive but very difficult to procure.

According to this invention the means for forming portable fences, enclosures, traction strips and the like, consist of a series of slat-like members, bars, or the like of wood or other suitable material of dimensions governed by the purpose, and spaced apart in more or less parallel arrangement, and linked together in a hinged manner by a series of coupling devices of wire or other suitable material arranged at two or more locations in the length of the said slat-like members, such coupling devices being looped or wrapped or wound around the related slat-like members, and having a portion or portions thereof passed through an orifice in the said member for securing the said coupling device thereto.

The coupling devices have formations at each end thereof positioned at opposite sides of the related slats, for enabling adjacent members to be linked together in the mentioned hinged manner so as to furnish a flexible length of material constituted of such members and permitting the rolling-up thereof.

There may be posts provided at suitable points, particularly when the material is to be used for portable stock enclosures, so as to reinforce the enclosure where desirable.

Means for coupling lengths of the material together as well as for connecting same to posts, and the like, may be also furnished.

When the invention is to be applied to more or less heavy uses such as for traction strips and the like the gauge of the wire is correspondingly heavier, and in some cases metal bar material, strapping or the like may be used.

A reinforcing and tension element may be associated with each linking or coupling device at one or both sides of the slat members at the orificed portion or portions thereof to take the pulling strain, and obviate damage to the jointing or pulling apart or breaking of the slat in a sidewise direction should unusual strain be imposed on the jointings furnished by the coupling devices. Such a strain may be imposed on the said linking elements and the slats if the fence is drawn taut or subjected to wire straining. This reinforcing and tension element may be formed as a rectangular stout metal plate having an oval or laterally elongated hole therein, and may be positioned at the back of the slat and abutted thereagainst and the coupling formation or loop shapings therein which pass through the slat orifice also pass through the hole in the said tension element.

In order to describe the invention more fully reference will now be made to the accompanying drawings forming part of this complete specification and wherein:

Figure 1 is a perspective view of a slat with one form of coupling means.

Figure 2 is a section on plane 2—2 of Figure 1.

Figure 3 is a fragmentary perspective view of a slat with another form of coupling means.

Figure 4 is a section on plane 4—4 of Figure 3.

Figure 5 is a fragmentary perspective of a slat furnished with a reinforcing or tension element with the coupling means.

Figure 6 is a section on plane 6—6 of Figure 5.

Figure 7 is a perspective view of the end member used in conjunction with the slats when forming an enclosure.

Figure 8 is a plan of a portion of one end of the enclosure.

Figure 9 is a perspective view of an enclosure with the ends left open.

Figure 10 is a similar view but with the enclosure closed.

Figure 11 is a fragmentary perspective view of the slats when used as a traction strip or track.

Referring to Figures 1 and 2 the coupling device consists of an elongated U-shaped wire link 12 having a hinging and spacing loop element 13 formed at one end thereof rightangularly of the main limb portion, and inwardly thereof there is a twisted portion 14 from which a short limb end 15 extends on one side of the slot 16, while the other and long limb 17 of the link 12 passes around the other side of the said slot 16 and has a bowed or inward setting 18 formed therein at about the medial point of the link length adapted to pass through the slat orifice 19 and protrude on the opposite side thereof. The long limb 17 continues around the other end edge of the slat 16 and forms a short hinge connecting element 20, and the free end of said long limb 17 being led along the opposite side of the slat 16 forms a short limb end 21 which with the other short limb end 15 is closed around or clipped onto the protruding portion of the setting 18.

These wire coupling devices are all preformed and are of standard size to suit the slat 16 and the short limb ends 15 and 21 are free so that the devices 12 can be interlinked together, the hinging loop 13 of one slat 16 has the short limb 15 of the next slat 16 passed therethrough to position the end of the short hinge loop 20 therein. The mentioned limb ends 15 and 21 are then clipped or closed onto the setting 18 and the coupling device drawn tightly in place on its slat 16. This linking together of the coupling devices 12 can be seen clearly in Figure 8. The hinging loops 13 also space the slats 16 apart at the desired intervals.

There may be two rows of these coupling devices 12, say one near each end of the slats 16 as shown in Figure 11, or there may be three rows as shown in Figures 9 and 10, where a medial row is shown between the outer rows. The number of rows may be increased or decreased according to the length of the slats 16 and other factors such as strength.

Referring to Figures 3 and 4 the coupling devices 12 are of modified form, in that the setting 18 in the long limb is omitted and the ends of the short limb portions 15 and 21 are passed through the slot orifice 19 and clipped or closed directly onto the said long limb 17. The other parts of this coupling device 12 are as before described.

Referring to Figures 5 and 6 a tension element 23 is shown embodied at one or both sides of the slat 16 although one side should be sufficient. This tension element 23 may be similar to a washer and have any suitable shaping and thickness. The hole in it may be of the same size as the orifice 19 in the slats 16 and the sideward pull of the coupling device is taken thereby.

Posts or bars or end pieces 24 may be fitted at different locations in a length or area of the enclosure or fencing, or at the ends of sections as seen in Figures 7, 8 and 9 and 10, and stakes 25 may be provided at suitable points to secure the fencing in place.

Clips 26 as seen in enlarged detail in Figure 7 may be used to secure the fencing to the posts, stakes or the like, and as shown have a small ring 27 at one end for engaging the hinging end 13 of a coupling device 12, while the other end has a larger ring 28 the uses of which will be appreciated from a perusal of Figures 8 to 10 inclusive.

A gate or the like (not shown) may be set up in the enclosure as desired.

In Figures 9 to 10 it is indicated how the enclosure can be set up either in curved or straight form, although it will be apparent that it may be formed into many shapes to suit the individual requirements, and can be quickly dismantled and folded.

Although the invention has been described herein mainly in relation to portable enclosures or fencing, it is not limited thereto as the same principle can be similarly applied to traction strips, air strips and the like.

I claim:

1. A portable fence, enclosure, traction strip, or the like consisting of a series of slat-like members of suitable material linked together and spaced apart in a hinged manner, in more or less parallel arrangement, by a series of coupling devices at at least two locations in the length of the said slat-like members, such coupling devices being looped around the related slat-like members, and having at least one formation in the said coupling devices extending through the related slats to lock the said devices thereto.

2. A portable fence, enclosure, traction strip, or the like according to claim 1, wherein the coupling devices have a hinging and spacing extension element or the like at one end thereof, and a short loop or hinge element at the other end, such elements being adapted to be engaged with the opposite element of an adjacent slat in the formation of a length of fencing or the like.

3. A portable fence, enclosure, traction strip or the like according to claim 1 wherein at least two rows of the coupling devices are embodied in each portable fence or the like.

4. A portable fence, enclosure, traction strip or the like according to claim 1, wherein at least one post, stake, or the like is associated with the portable fencing, enclosure, traction strip or the like.

5. A portable fence, enclosure, traction strip, or the like according to claim 1, wherein the coupling device has the engaging and securing formation, or formations, extending through an orifice in the slat at or about medially of the width thereof.

6. A portable fence, enclosure, traction strip, or the like according to claim 5, wherein the coupling device has its opposite sides engaging those of the related slat connected together through the slat orifice.

7. A portable fence, enclosure, traction strip, or the like according to claim 5, wherein the coupling device is formed of wire and has its ends extending through the slat orifice from one side and secured to the opposite side of said device.

8. A portable fence, enclosure, traction strip, or the like according to claim 5, wherein a tension element such as an orificed washer or the like is fitted on at least one side of a slat over the orifice therein, and the securing connection of said device to said slat is fitted therethrough as and for the purpose set forth.

9. A portable fence, enclosure, traction strip, or the like according to claim 1, wherein the coupling device is formed of wire with a loop at one end at right angles to the major portion of the said device, extending around a slat, such loop forming a hinging and spacing element having a long limb which extends along one side of the said slat, and has an inward shaping or set between its ends adapted to extend through the slot and protrude on the opposite side, said long limb extending around the opposite end of the slat, and presenting a short loop-like hinging element, and continuing along the other side of said slat, and being chipped to the said set at its extremity, while a second short limb extends from the said opposite end of said device adjacent the hinging and spacing element on the side opposite the said long limb and is clipped to the said set portion.

10. A portable fence, enclosure, traction strip, or the like according to claim 9, wherein the set formation is eliminated and the two short limb ends pass through the slat orifice and clip to the opposite side of the long limb of the coupling device.

JOHN WILSON ANDERSON.

REFERENCES CITED

The following references are of record in the file of this patent:

UNITED STATES PATENTS

| Number | Name | Date |
| --- | --- | --- |
| 1,852,910 | Williams et al. | Apr. 5, 1932 |
| 1,960,541 | Maas | May 29, 1934 |
| 2,113,743 | Phipps | Apr. 12, 1938 |